United States Patent [19]
Thomas

[11] Patent Number: 4,790,430
[45] Date of Patent: Dec. 13, 1988

[54] AIRCRAFT BRAKE SHIPPING CONTAINER

[76] Inventor: William A. Thomas, 2444 Santa Ynez Way, Palm Springs, Calif. 92264

[21] Appl. No.: 145,477

[22] Filed: Jan. 19, 1988

[51] Int. Cl.[4] .................................................. B65D 85/02
[52] U.S. Cl. ..................................... 206/303; 206/452; 206/585
[58] Field of Search ............... 206/303, 309, 310, 451, 206/452, 454, 583, 585; 211/40; 312/10

[56] References Cited

U.S. PATENT DOCUMENTS

| | | | |
|---|---|---|---|
| 1,212,758 | 1/1917 | Freez | 206/452 |
| 2,771,184 | 11/1956 | Ryno et al. | 206/583 |
| 2,881,004 | 4/1959 | Hahn | 312/10 |
| 3,643,240 | 2/1972 | Raiser | 206/303 |
| 3,889,817 | 6/1975 | Berkman | 211/40 |
| 3,913,735 | 10/1975 | Durbin | 20/303 |
| 4,577,756 | 3/1986 | Hennessy et al. | 206/303 |
| 4,700,839 | 10/1987 | Fujii | 206/303 |

FOREIGN PATENT DOCUMENTS 482667  4/1938  United Kingdom .................. 312/10

Primary Examiner—David T. Fidei
Attorney, Agent, or Firm—Poms, Smith, Lande & Rose

[57] ABSTRACT

A container for shipping brake assemblies includes a base support member, a body tube, and a top closure member. A threaded shaft is provided extending axially through the body tube from above the top closure member to a nut imbedded in the base support member. A snug nut is provided on the threaded shaft just above the top closure member and tightening the snug nut clamps together the body tube and top and base members. Upper and lower truncated cone-shaped assemblies are provided and mounted on the threaded shaft with the truncated ends facing one another and the lower assembly affixed to the base support member. A plug nut is provided for clamping the cone assemblies together and to the base support member when brake assemblies are mounted between them. For more fragile carbon brake heatsinks, a post-and-bellows assembly may be provided whereby carbon brake heatsinks are mounted on guide posts extending from a shock absorbing bellows and held in place by a plug nut tightened against an impact absorbing wheel-like assembly. The container's top and base members may have either circular peripheries to facilitate rolling transport of containers or polygonal peripheries to inhibit such movement. Also, the external surfaces of the base and top members may have corresponding projections and recesses to facilitate container stacking. The container is preferably made primarily of rotationally molded plastic having some inherent flexibility thereby making it both lightweight and resilient enough to provide shock absorbing characteristics.

20 Claims, 2 Drawing Sheets

AIRCRAFT BRAKE SHIPPING CONTAINER

FIELD OF THE INVENTION

This invention relates to containers for shipping brake assemblies including portions of such assemblies which are fragile and susceptible to breakage during shipment.

BACKGROUND OF THE INVENTION

Certain types of brake assemblies, including certain fragile portions of brake assemblies such as the carbon heat sinks of disc brakes, may require regular servicing, repair or refurbishment and must be transported with care to locations where such activities may be accomplished. Up to the present time the containers available for transporting brake assemblies have been wooden crates that have had to be specially made for each size of brake assembly being handled.

Accordingly, an important object of the present invention is to provide universal containers for shipping brake assemblies of different sizes, and that can adequately protect them from damage and breakage during transportation.

Another aspect of the type of wooden container previously used to ship brake assemblies was their great weight, generally between 75 and 200 pounds, and the large shipping costs associated with this weight.

Accordingly, another object of the present invention is to provide a brake assembly shipping container with a significantly lower total weight to substantially reduce shipping costs.

A further aspect of high weight wooden shipping containers is the difficulty of handling and storing the containers when they are loaded with brake assemblies.

Accordingly, an additional important object of the present invention is to provide a container for shipping brake assemblies that is easier and safer to handle and store when brake assemblies are inside it.

SUMMARY OF THE INVENTION

In accordance with specific embodiments illustrating the principles of the present invention, instead of using ordinary wooden crates for shipping brake assemblies, a different configuration is employed. Specifically, the present invention pertains to containers for shipping brake assemblies and certain fragile portions of brake assemblies such as carbon heat sinks from disc brakes, and includes a base support member, an open ended cylindrical tube and a top closure member. The base and top members may be formed of rotationally molded plastic and are therefore hollow, lightweight, durable and somewhat resilient to provide shock absorbing characteristics. The cylindrical tube may be formed of a wound paper and wax composite that is also lightweight and strong and somewhat resilient.

One end of the cylindrical tube is mounted on the base support member and the other end of the tube may be sealed when the top closure member is mounted on it. A threaded shaft extends axially through the tube from above the upper surface of the top closure member to a base nut imbedded in the base support member. A snug nut is provided on the threaded shaft just above the upper surface of the top closure member. Tightening the snug nut against the top member's upper surface while the threaded shaft is threaded in the base nut forces the top and base members against the tube's ends thereby sealing the container. A metal reinforcing plate may be included between the snug nut and the upper surface of the top closure member to provide support against the pressure of the snug nut.

One aspect of one embodiment of the present invention involves the use of upper and lower coneshaped parts mounted on the threaded shaft between the top and base members. These parts are secured to the assembly described above with their apexes facing one another and with brake assemblies of any desired size mounted on the opposed conical surfaces.

The lower or bottom cone-shaped part may be rigidly affixed to the upper surface of the base support member. Brake assemblies may be mounted between the cone-shaped parts and held securely in place when the cone-shaped parts are clamped together. Clamping may be achieved by a plug nut that is threaded on the threaded shaft just above the upper end of the upper or top cone-shaped part. The plug nut is positioned on the threaded shaft so that tightening of the shaft into the base nut forces the plug nut against the top cone-shaped part, thereby clamping the top and bottom cone-shaped parts to the brake assembly positioned between them and to the base support member. A wing nut or other rotational mechanism such as a hex bolt head is rigidly affixed to the upper end of the threaded shaft to facilitate turning the shaft and actuating the clamping action of the plug nut. The length of the threaded shaft is such that, when it is in its fully tightened position, its upper end is contained within a recess in the upper surface of the top closure member. As will be discussed below, this aspect of the invention facilitates vertical stacking of containers.

Another aspect of the invention is that the upper and lower cone-shaped parts may be made of rotationally molded plastic, thereby making them hollow, lightweight, durable and somewhat resilient. These characteristics result in a container for shipping brake assemblies that is lighter and stronger than those previously used and which provides greater protection against damage to brake assemblies because of the shock absorbing characteristics of the resilient cone-shaped parts.

Regarding a further aspect of the invention, the surfaces of the cone-shaped parts may be generally concave in shape thereby increasing the area of surface-to-surface contact between the cone-shaped parts and the brake assemblies mounted between them. This increased area of contact helps to distribute any forces impacting the container and transferred to the brake assemblies, resulting in greater protection from damage to those brake assemblies. This increased area of surface contact will also result in a more secure clamp on the brake assemblies by the cone-shaped parts.

Concerning another embodiment of the present invention, a post-and-bellows assembly may be provided for holding brake assemblies in place within the container and providing even greater protection from damage for particularly fragile brake assemblies, such as carbon heat sinks from disc brakes. A resilient, shock absorbing, bellows-like part is mounted on and may be rigidly affixed to the upper surface of the base support member, and a plurality of vertical guide posts spaced around the threaded shaft extend up from the bellows. Brake assemblies may be slipped on the guide posts and mounted on the resilient bellows-like part. A resilient, wheel-like impact isolator may be slipped on the threaded shaft and clamped to the top of a brake assembly to hold it firmly in place within the container. The rim of the wheel shaped member engages the upper surface of the carbon heat sink assembly, and the spokes of the wheel-shaped isolator extend outward between the guide posts. Clamping is achieved by the same plug nut and threaded shaft rotation action described above, acting on the central hub of the isolator.

The bellows-like part and vertical guide posts may be made of rotationally molded plastic, thereby making them hollow, lightweight, durable and somewhat resilient. Also, the wheel-like impact isolator may be made of plastic, thereby making it lightweight and resilient. These features provide a brake assembly shipping container that is stronger and lighter than those previously in use and which provides greater protection against breakage of brake assemblies because of shock absorbing characteristics.

Concerning another aspect of the invention, the bellows-like part may include a series of integral resilient or flexible ribs that provide excellent shock absorbing qualities and thereby provide a container that gives correspondingly improved protection to brake assemblies.

With regard to another aspect of the invention, the wheel-like impact isolator may be in the form of an outer rim, a central disc or hub with a central hole for passage of the threaded shaft, and a plurality of spokes flexibly connecting the hub to the outer rim. Also, the distance between the upper and lower surfaces of the hub and spokes may be less than the distance between the upper and lower surfaces of the outer rim, thereby increasing the flexibility of the hub-to-rim connection. Thus, when the outer rim engages the brake assemblies through the clamping action of the plug nut and rotating shaft, the impact isolator will provide significant dampening of forces imparted onto the brake assemblies, when the shipping container is subject to shock.

Regarding another aspect of the present invention, the peripheral surfaces of the top closure member and the base support member may be circularly shaped to facilitate rolling transport of containers, or they may be polygonally shaped, with an octagonal shape being preferred, so that they will not roll. It is believed that these features will result in a shipping container that is easier to manipulate and handle depending upon the needs of individual users.

Concerning still another aspect of the invention, the upper surface of the base support member and the lower surface of the top closure member may have shallow, peripherally located grooves for receiving the ends of the tube. This feature results in firmer seating of the tube against these members and thereby results in a sturdier and safer shipping container.

Another feature of the invention involves forming the top closure member and base support member so that projections on the latter correspond with and fit into recesses on the former. Thus, containers may be vertically stacked with a positive engagement between the base of one container and the top of another.

Other objects, features and advantages of the invention will become apparent from a consideration of the following detailed description and from the accompanying drawings.

DETAILED DESCRIPTION

Figure 1:
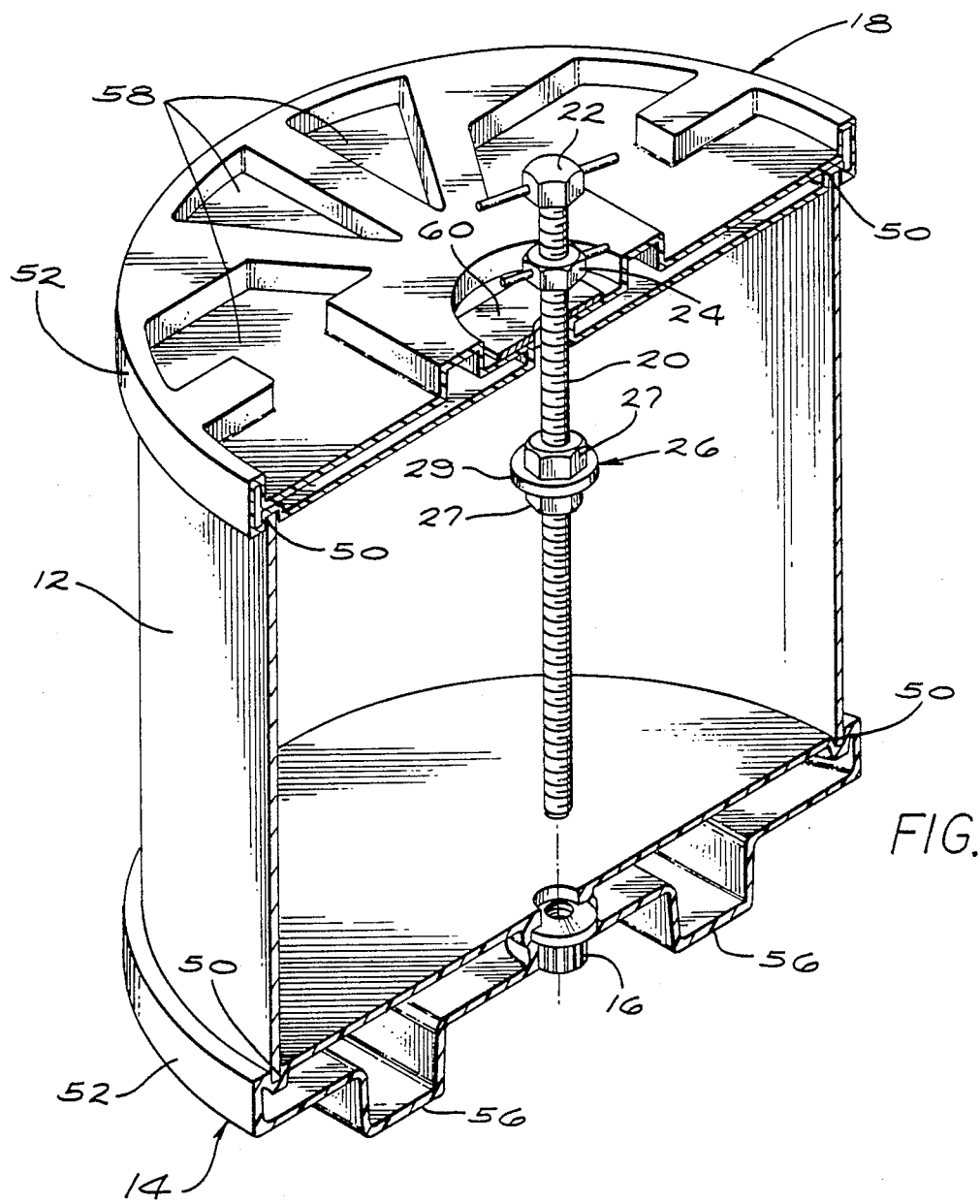
FIG. 1 is a cutaway perspective view of a brake assembly shipping container without its internal assembly for holding brake assemblies in place.

Referring more particularly to the drawings, FIG. 1 is a cutaway perspective view of a container for shipping aircraft brake assemblies, showing a body tube 12, a base support member 14 with a centrally located base nut 16, and a top closure member 18. A threaded shaft 20 runs axially through the body tube 12 with its upper end extending above the upper surface of the top closure member 18 and its lower end capable of being threaded into the base nut 16. The threaded shaft 20 is provided with a wing nut or other rotational mechanism 22 that is rigidly affixed to the upper end of the threaded shaft 20 and is used to rotate the shaft. The threaded shaft 20 is also provided with a snug nut 24 located between the upper surface of the top closure member 18 and the wing nut 22, and a plug nut 26 located between the base support member 14 and the top closure member 18. The purpose of the snug nut 24 and the plug nut 26 will be made clear in the description which follows. It may be noted that in the preferred embodiment the base support member 14 and top closure member 18 are made of rotationally molded plastic and are therefore hollow, lightweight and somewhat resilient, thereby providing shock absorbing characteristics to the container.

Figure 2:
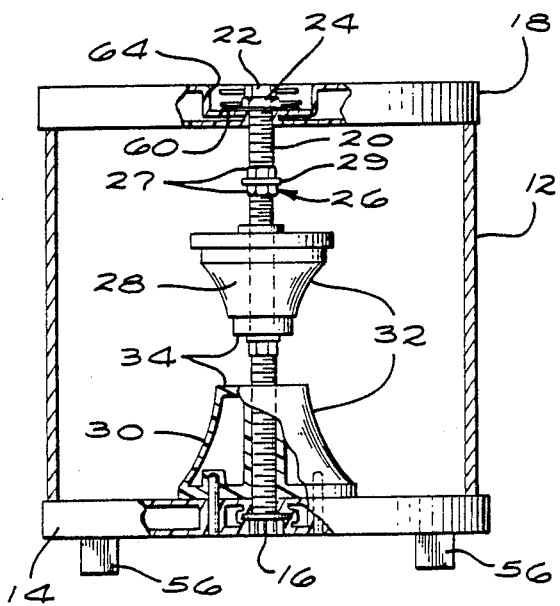
FIG. 2 is a cross-sectional view of a brake assembly shipping container illustrating a cone-type assembly for holding brake assemblies in place.
Figure 4:
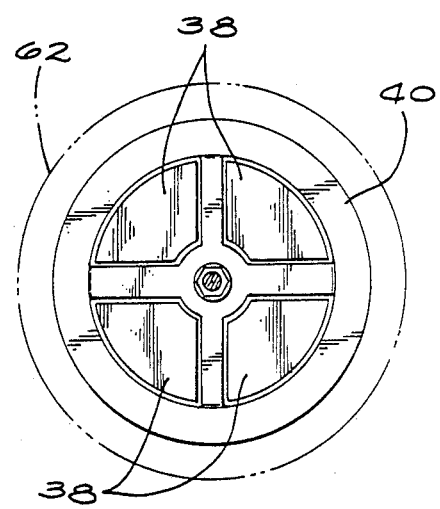
FIG. 4 is a cross-sectional view taken along line IV—IV of FIG. 3.

In accordance with one embodiment of the invention, as illustrated in FIG. 2, the container is provided with top 28 and bottom 30 cone-shaped parts with truncated apexes 34 and generally concave surfaces 32. The cone-shaped parts 28 and 30 are located along the threaded shaft 20 and below the plug nut 26, with their truncated apexes 34 facing one another and with the bottom cone-shaped part 30 rigidly affixed to the upper surface of the base support member 14. It may be noted that in the preferred embodiment the cone-shaped parts 28 and 30 are made of rotationally molded plastic, thereby providing the desired low weight and high resiliency characteristics previously described.

A brake assembly, not shown in FIG. 2, is mounted on the bottom cone-shaped part 30 and is held securely in place by being clamped between the top and bottom cone-shaped parts 28 and 30. The cone-shaped parts 28 and 30 are clamped to the brake assembly by positioning the plug nut 26 on the threaded shaft in a location such that using the wing nut 22 to tighten the threaded shaft 20 into the base nut 16 forces the plug nut 26 against the top cone-shaped part 28. It may be noted that the generally concave surfaces 32 of the top and bottom cone-shaped parts 28 and 30 allow for greater surface-to-surface contact between the clamped brake assembly and the cone-shaped parts, thereby giving a firmer grip on the brake assembly and allowing more effective distribution and dampening of shocks that might be transmitted to the clamped brake assembly. It may also be noted that when the threaded shaft 20 is tightened into the base nut 16, the shaft's upper end is contained within a central recess 64 in the top closure member 18. As will become clear below, this facilitates the vertical stacking of containers.

Also, it may be further noted that the plug nut 26 includes upper and lower nuts 27 between which is sandwiched a resilient rubber or neoprene washer 29. This allows the plug nut 26 to be more firmly seated against the top cone-shaped part 28 when the threaded shaft 20 is tightened into the base nut 16. Concerning the showing of plug nut 26 in FIG. 2, it has been shown spaced from the top of the upper conical member 28 for ease in illustration. In practice, it would be positioned on shaft 20 so that with the particular size brake assembly being shipped, the nut 26 would firmly engage the upper surface of cone 28 when threaded shaft 20 is tightened into nut 16. With different internal diameter brake assemblies accommodated on the conical support members 28 and 30, the position of the plug nut 26 would be shifted.

Figure 3:
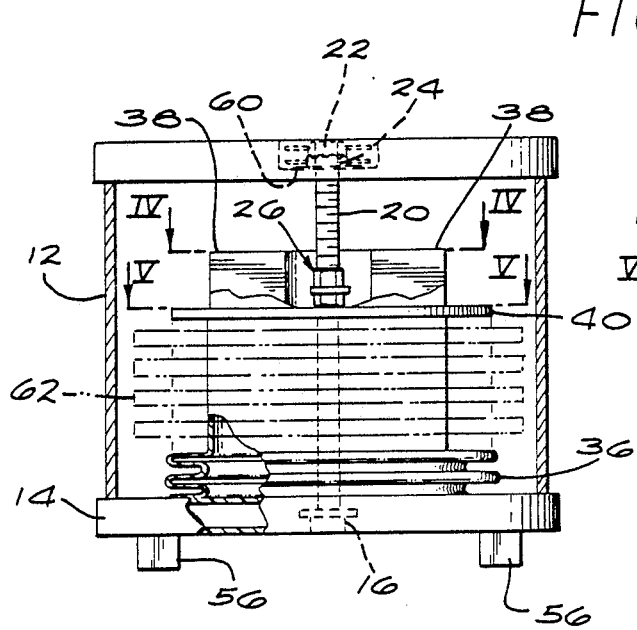
FIG. 3 is a cross-sectional view of a brake assembly shipping container illustrating a post-andbellows type assembly for holding brake assemblies in place.

As illustrated in FIGS. 2 and 3, after the threaded shaft 20 is fully tightened into the base nut 16, thereby clamping a brake assembly in place within the container, the snug nut 24 is tightened against the top surface of the top closure member 18 thereby forcing the top closure member 18 and the base support member 14 against the ends of the body tube 12 and sealing the container. A metal reinforcing plate 60 is positioned in the top closure member's central recess 64 between the snug nut 24 and the upper surface of the top closure member 18 to provide support against the pressure of the tightened snug nut 24. Plate 60 may be recessed into and form part of the roto-molded top closure 18. Also, as is best seen in FIG. 1, the top surface of the base support member 14 and the bottom surface of the top closure member 18 have shallow, peripherally located grooves 50 for receiving the ends of the body tube 12 and thereby making a more secure seal when the snug nut 24 is tightened.

FIG. 3 illustrates another embodiment of an aircraft brake shipping container. In the FIG. 3 embodiment, a resilient bellows-like part 36 is rigidly affixed to the upper surface of the base support member 14 and a plurality of vertical guide posts 38 are spaced about the threaded shaft 20 while extending up from the bellows-like part 36. In the preferred embodiment illustrated in FIG. 3, a brake assembly 62 is slipped over the guide posts 38 and mounted on the bellows-like part 36. A resilient wheel-like impact isolator 40 is slipped over the vertical guide posts 40 and clamped against the top surface of the brake assembly 62 thereby holding the brake assembly 62 securely between the bellows-like part 36 and the impact isolator 40. Clamping of the brake assembly 62 is by the same plug nut 26 and threaded shaft rotation action previously described. It is noted that in the preferred embodiment, the bellows-like part 36 and the vertical guide posts 38 are made of rotationally molded plastic, thereby providing the same weight and resiliency characteristics previously described.

Figure 5:
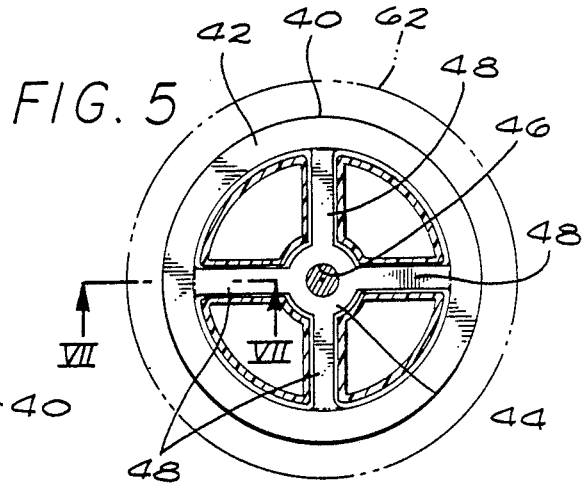
FIG. 5 is a cross-sectional view taken along line V—V of FIG. 3.
Figure 7:
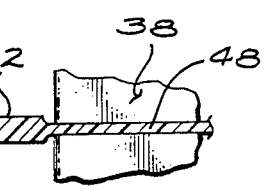
FIG. 7 is a cross-sectional view taken along line VII—VII of FIG. 5.

As is best illustrated in FIG. 5, the impact isolator 40 has an outer rim 42 that engages the brake assembly 62 and that is flexibly connected by a plurality of spokes 48 to a central disc or hub 44 with a central hole 46 through which the threaded shaft 20 passes. Also, as is best seen in FIG. 7, the distance between the upper and lower surfaces of the impact isolator's spokes 48 is less than the distance between the upper and lower surfaces of the isolator's outer rim 42, thereby increasing the flexibility of the hub-to-rim connection and improving the bearing of the rim 42 on the brake assembly.

Figure 6:
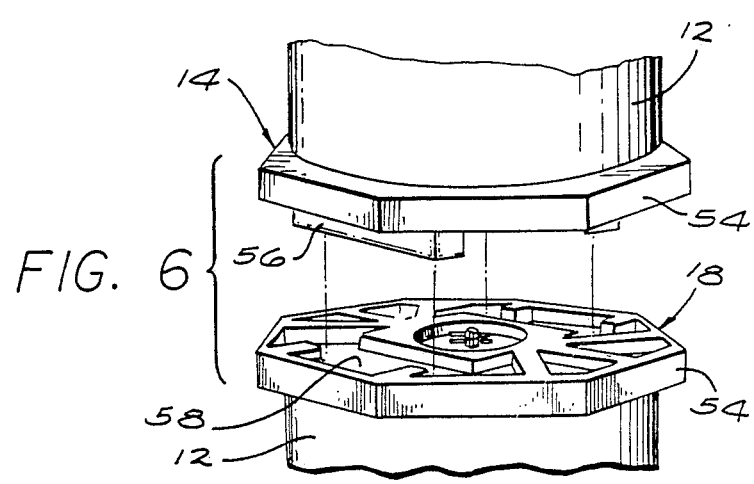
FIG. 6 is a perspective view of the top closure member and the base support member of separate brake assembly shipping containers.

As may be seen in FIGS. 1 and 6, the top closure member 18 and the base support member 14 may have either a circular peripheral surface 52 or a polygonal peripheral surface 54 to either facilitate or inhibit rolling transport of containers. It may also be noted that the top closure member 18 is formed with a plurality of recesses 58 and the base support member 14 is formed with a plurality of projections 56. As is best seen in FIG. 6, the recesses 58 and projections 56 correspond to one another to allow positive engagement between vertically stacked containers.

In conclusion, it is to be understood that the foregoing description and accompanying drawings relate to only one preferred embodiment of the present invention. Other embodiments may be utilized without departing from the spirit and scope of the invention. Thus, by way of example and not of limitation, the threaded shaft 20 could be a single long headed bolt and with the nut 26 resiliently affixed thereto, so that threading the bolt into nut 16 would assemble the unit and clamp the inner members together in a single step. Also, the parts of the invention could be made of materials other than those discussed herein. Accordingly, it is to be further understood that the detailed description and drawings set forth hereinabove are for illustrative purposes only and do not constitute a limitation on the scope of the invention.

What is claimed is:

1. A compact, lightweight, reusable container for shipping brake assemblies comprising:
   an open ended cylindrical tube having first and second ends;
   a rotationally molded, plastic base support member on which said first end of said cylindrical tube is mounted;
   a base nut imbedded in the center of said base support member and aligned with the vertical axis of said cylindrical tube;
   a rotationally molded, plastic top closure member having a hole centered along the vertical axis of said cylindrical tube and which is mounted on said second end of said cylindrical tube;
   a threaded shaft running along the vertical axis of said cylindrical tube with one end of said shaft threaded into said base nut and the other end of said shaft extending slightly above the upper surface of said top closure member through said hole in said member;
   means for rotating said threaded shaft, said rotating means being rigidly affixed to the upper end of said threaded shaft extending through said top closure member;
   a snug nut threaded onto said threaded shaft between said rotating means and said top closure member, whereby tightening of said snug nut against said upper surface of said top closure member forces said top closure member and said base support member against said ends of said cylindrical tube;
   upper and lower spaced means for holding said brake assemblies in place within said container; and
   plug nut means threaded on said threaded shaft for clamping said upper and lower spaced holding means together with said brake assemblies supported between them as said means for rotating said threaded shaft is actuated.

2. A compact, lightweight, reusable container for shipping brake assemblies as defined in claim 1 wherein said upper and lower spaced holding means include hollow, truncated, top and bottom cone-shaped assemblies, said cone-shaped assemblies being mounted on said threaded shaft with the vertical axes of said cone-shaped assemblies coaxial with said shaft, the truncated ends of said cone-shaped assemblies facing each other, and said bottom cone-shaped assembly rigidly affixed to the upper surface of said base support member.

3. A compact, lightweight, reusable container for shipping brake assemblies as defined in claim 1 wherein said lower spaced holding means includes a hollow, resilient, bellows-type assembly rigidly affixed to the upper surface of said base support member, and a plurality of vertical guide members extending up from the upper surface of said bellows-type assembly and spaced about said threaded shaft.

4. A compact, lightweight, reusable container for shipping brake assemblies as defined in claim 3 wherein said upper spaced holding means includes a wheel-shaped impact isolator having an outer rim for engaging said brake assemblies, a central disc with a central hole through which said threaded shaft passes, a plurality of spokes flexibly connecting said central disc to said outer rim, and said spokes extending between said vertical guide members.

5. A compact, lightweight, reusable container for shipping brake assemblies as defined in claim 4 wherein the distance between the upper and lower surfaces of said central disc and said spokes is less than the distance between the upper and lower surfaces of said outer rim.

6. A compact, lightweight, reusable container for shipping brake assemblies as defined in claim 1 wherein the upper surface of said base support member and the lower surface of said top closure member have shallow, peripherally located grooves for receiving said first and second ends of said cylindrical tube.

7. A compact, lightweight, reusable container for shipping brake assemblies as defined in claim 1 wherein the peripheral surfaces of said base support member and said top closure member are circularly shaped.

8. A compact, lightweight, reusable container for shipping brake assemblies as defined in claim 1 wherein the peripheral surfaces of said base support member and said top closure member are polygonally shaped.

9. A compact, lightweight, reusable container for shipping brake assemblies as defined in claim 1 wherein the upper surface of said top closure member has a plurality of recesses and the lower surface of said base support member has a plurality of projections that correspond with said recesses and that fit into said recesses when said containers are vertically stacked.

10. A compact, lightweight, reusable container for shipping brake assemblies comprising:
an open ended cylindrical tube having first and second ends;
a base support member on which said first end of said cylindrical tube is mounted;
threaded means located in the center of said base support member;
a top closure member having a central hole and which is mounted on said second end of said cylindrical tube;
a threaded shaft extending along the vertical axis of said cylindrical tube with one end of said shaft threaded into said threaded means and the other end of said shaft extending slightly above the upper surface of said top closure member through said hole in said member;
means for rotating said threaded shaft, said rotating means located at the upper end of said threaded shaft;
means for supporting and holding in place said brake assemblies within said container operative as said rotating means is actuated, said supporting and holding means being located along said threaded shaft and between said top closure member and said base support member; and
a snug nut threaded onto said threaded shaft between said rotating means and said top closure member, whereby tightening of said snug nut against said upper surface of said top closure member forces said top closure member and said base support member against said ends of said cylindrical tube.

11. A compact, lightweight, reusable container for shipping brake assemblies as defined in claim 10 wherein the upper surface of said base support member and the lower surface of said top closure member have shallow, peripherally located grooves for receiving said first and second ends of said cylindrical tube.

12. A compact, lightweight, reusable container for shipping brake assemblies as defined in claim 10 wherein the peripheral surfaces of said base support member and said top closure member are circularly shaped.

13. A compact, lightweight, reusable container for shipping brake assemblies as defined in claim 10 wherein the peripheral surfaces of said base support member and said top closure member are octagonally shaped.

14. A compact, lightweight, resuable container for shipping brake assemblies as defined in claim 10 wherein the upper surface of said top closure member has a plurality of recesses and the lower surface of said base support member has a plurality of projections that correspond with said recesses and that fit into said recesses when said containers are vertically stacked.

15. A compact, lightweight, reusable container for shipping brake assemblies comprising:
an open ended tube having first and second ends;
a base support member on which said first end of said tube is mounted;
an internally threaded opening in the center of said base support member;
a top closure member having a central hole and which is mounted on said second end of said tube;
a threaded shaft running through said tube with one end of said shaft threaded into said internally threaded opening and the other end of said shaft extending above the upper surface of said top closure member through said hole in said member;
means on said threaded shaft located above the upper surface of said top closure for forcing said top closure member and said base support member against said ends of said tube; and
means for supporting and holding in place said brake assemblies within said container, said supporting and holding means including at least one rotationally molded part for resiliently mounting said brake assemblies.

16. A compact, lightweight, reusable container for shipping brake assemblies as defined in claim 15 wherein said support and holding means includes two opposed conical holding members for accommodating brake assemblies of different sizes.

17. A compact, lightweight, reusable container for shipping brake assemblies as defined in claim 15 wherein said supporting and holding means includes a resilient lower support member with upstanding projections, and an upper, wheel-shaped holding member having an outer rim for engaging said brake assemblies and spokes extending outwardly from a central hub to said rims, with said spokes extending between said upstanding projections.

18. A compact, lightweight, reusable container for shipping brake assemblies as defined in claim 15 wherein the upper surface of said base support member and the lower surface of said top closure member have shallow, peripherally located grooves for receiving said first and second ends of said cylindrical tube.

19. A compact, lightweight, reusable container for shipping brake assemblies as defined in claim 15 wherein the peripheral surfaces of said base support member and said top closure member are circularly shaped.

20. A compact, lightweight, reusable container for shipping brake assemblies as defined in claim 15, wherein the upper surface of said top closure member has a plurality of recesses and the lower surface of said base support member has a plurality of projections that correspond with said recesses and that fit into said recesses when said containers are vertically stacked.

* * * * *